United States Patent
Backov et al.

(10) Patent No.: US 8,591,857 B2
(45) Date of Patent: Nov. 26, 2013

(54) AEROGELS BASED ON CARBON NANOTUBES

(75) Inventors: Renal Backov, Bordeaux (FR); Pierre Delhaes, Gradignan (FR); Florent Carn, Orthevielle (FR); Celine Leroy, Saint Medard en Jalles (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 424 days.

(21) Appl. No.: 12/519,932

(22) PCT Filed: Dec. 20, 2007

(86) PCT No.: PCT/FR2007/002135
§ 371 (c)(1),
(2), (4) Date: Dec. 11, 2009

(87) PCT Pub. No.: WO2008/096065
PCT Pub. Date: Aug. 14, 2008

(65) Prior Publication Data
US 2010/0092371 A1    Apr. 15, 2010

(30) Foreign Application Priority Data
Dec. 20, 2006   (FR) ..................... 06 11143

(51) Int. Cl.
*C09C 1/56* (2006.01)
(52) U.S. Cl.
USPC ......... 423/447.2; 977/742; 423/460; 428/113
(58) Field of Classification Search
USPC ............... 423/460, 445 B, 447.2; 977/742; 428/113
See application file for complete search history.

(56) References Cited

FOREIGN PATENT DOCUMENTS

WO   WO 2004/009673      1/2004
WO   WO 2008000163 A1 *  1/2008

OTHER PUBLICATIONS

Bryning et al. "Carbon Nanotube Aerogels". Advanced Materials vol. 19, Issue 5, pp. 661-664, Mar. 2007.*
Ya-Li Li, Ian A. Kinloch, Alan H. Windle; "Direct Spinning of Carbon Nanotube Fibers From Chemical Vapor Deposition Synthesis". Science vol. 304 Apr. 9, 2004. 276-278.*
Mei Zhang, et al.; "Strong, Transparent, Multifunctional, Carbon Nanotube Sheets" Science vol. 39. Aug. 19, 2005. 1215-1219.*
B. Vigolo et al. "Macroscopic Fibers and Ribbons of Oriented Carbon Nanotubes" DOI: 10.1126/science.290.5495.1331 Science 290, 1331 (2000).*
Johnson, D. F., et al. "Adhered Supported Carbon Nanotubes". Journal of Nanoparticle Research. Feb. 2001, vol. 3, Issue 1, pp. 63-71.*
Bryning, B., et al. "Carbon Nanotube Aerogels". Adv. Mater. 2007, 19, 661-664.*
International Search Report dated Jul. 10, 2008.

(Continued)

*Primary Examiner* — Stuart Hendrickson
*Assistant Examiner* — Richard M Rump
(74) *Attorney, Agent, or Firm* — Young & Thompson

(57) ABSTRACT

The invention relates to a method for preparing a carbon aerogel from agglomerated carbon nanotubes, that comprises the following steps: (A) preparing an aqueous dispersion of carbon nanotubes in water in the presence of a dispersing agent; (B) forming a foam from the nanotubes aqueous dispersion of step (A) by bulking under the action of a gas in the presence of a foaming agent; and (C) freezing the foam obtained in step (B) and removing the water by sublimation. The invention also relates to the carbon aerogels thus obtained, and to their use essentially as partition materials or biomaterials.

22 Claims, 1 Drawing Sheet

(56) References Cited

OTHER PUBLICATIONS

Jian Chen et al., "A new method for the preparation of stable carbon nanotube organogels", Carbon, Sep. 2006, pp. 2142-2146, vol. 44, No. 11, Elsevier Ltd., Oxford, United Kingdom.

Marcelo Motta et al., "The parameter space for the direct spinning of fibres and films of carbon nanotubes", Physica E, 2007, pp. 40-43, vol. 37, Nos. 1-2, Elsevier B.V., the Netherlands.

* cited by examiner

AEROGELS BASED ON CARBON NANOTUBES

The present invention relates to novel materials of the carbon aerogel type which are found to be useful especially as separating materials, especially separating materials suitable for the filtration of liquid media.

The materials commonly referred to as "carbon aerogels" are macroscopic materials which are constituted substantially (and generally exclusively) of carbon and which have an extremely porous structure, resulting in a very low apparent density. Typically, in a carbon aerogel, the volume occupied by the pores represents at least 70% of the total volume of the material, with a corresponding apparent density of generally below 0.6 g/cm$^3$. For further details regarding structures of the carbon aerogel type, reference may be made especially to the article "*les aérogels et le structure alvéolaires: deux exemples de mousses de carbone*" by L. Kocon and T. Piquero, in *L'actualité Chimique*, No. 245-246, pp. 119-123 (March-April 2006).

Carbon aerogels are generally obtained by so-called "templating" processes. Broadly, in such processes a three-dimensional porous structure of carbon or of a carbon precursor is formed by using a solid structure or a molecular organisation of the liquid crystal type as a "mould" for the desired structure. That "mould", which is called "template", can have different forms depending on the process used. Within this context there are three large families of templating processes which yield carbon aerogels:

(1) Use of Micro- or Meso-Porous Solids as Solid Templates

According to this preparation method, the aerogel is synthesised by filling the pores of a porous material used as a mould with carbon. Typically, materials of the aluminium, silica or aluminosilicate type are used, in the form of a microporous or mesoporous material (for example zeolite or mesostructures of type MCM-41). The mould is then destroyed, generally by acid attack, whereby an impression of the mould formed wholly of carbon is recovered. In these techniques, the initial introduction of the carbon into the template material can be carried out by direct deposition of carbon, generally by chemical deposition in the vapour phase, especially by chemical vapour deposition (CVD), or alternatively by impregnation of an organic liquid within the pores, which liquid is subsequently calcined in order to be converted into carbon. Examples of the preparation of aerogels by this method are described especially in the articles "Nouveaux concepts d'élaboration de matériaux carbonés poreux" by C. Vix-Guterl, J. Parmentier, P. Delhaés, in *L'actualité chimique*, no. 245-246, pp. 124-128 (March-April 2006) and "*Synthesis of highly ordered carbon molecular sieves via template-mediated structural transformation*" by R. Ryoo, S.-H. Soo, S. Jun, in *The Journal of Physical chemistry B*, 103 (37), pp. 7743-7746 (1999).

(2) Templating of Carbon in a Liquid or Gelified Medium

According to this other embodiment, the organisation of the carbon in aerogel form is carried out within a liquid or gelified medium, typically in the form of a liquid crystal. In this case, the "mould" used is not solid in nature but nevertheless imparts an organised structure to the carbon structure that is synthesised.

The aerogel used within this context is generally obtained by direct structuring of a carbon-containing mesophase, followed by carbonisation of the medium for forming the structure, especially by carrying out the techniques described in the articles "*High-thermal conductivity, mesophase pitch-derived carbon foams: effect of precursors on structure and properties*" by J. Klett et al., in *Carbon*, 38, pp. 153-173 (2000) or "*Novel high strength graphitic foams*", by T. Beechem, K. Lafdi, in *Carbon*, 44, pp. 1548-1549 (2002).

(3) Templating of Carbon-Containing Precursors in a Liquid or Gelified Medium

According to this other variant, an aerogel is formed by direct structuring not of the carbon, as in the preceding variant, but of the organic constituents, whereby an organic aerogel is obtained, which is subsequently carbonised by heat treatment to give the desired carbon aerogel. Within this context, it is possible to use especially the process described in the articles "*Fabrication of nano-structure control of carbon aerogels via microemulsion templated sol-gel polymerisation method*", by D. Wu, R. Fu, M. S. Dresselhaus, G. Dresselhaus, in *Carbon*, 44, pp. 675-680 (2005) or "*Preparation and properties of resorcinol formaldehyde organic and carbon gels*", by S. A. Al-Muthtsabeb, J. A. Ritter, in *Adv. Mater.*, 15(2), pp. 101-104 (2003).

The carbon aerogels as obtained by the above-mentioned templating processes are materials which have valuable properties and which have many applications. In general, they can be used in virtually all the known applications of aerogel-type materials, where use can be made of their high porosity and their relatively high specific surface area. Especially, their chemical inertness towards many reagents and their good heat stability render them valuable materials especially as catalyst supports, especially in a reducing medium. They can also be used as sound or anti-vibration insulators, given their relatively good mechanical strength.

Nevertheless, these advantages aside, carbon aerogels are found to be poorly suitable for other known applications of aerogels, for example in the field of separation and especially in the field of solid/liquid filtration. It has in fact been found that, at the present time, no carbon aerogels are known that have good properties both in terms of separation efficiency (precision) and in terms of separation speed.

More precisely, the majority of current aerogels have a pore population with relatively narrow distribution around an average value, which prevents optimisation in terms of both separation efficiency and separation speed. When a separation is carried out using porous materials that have a pore population of relatively uniform size, the efficiency of the separation is all the more efficient as the average size of the pores falls but, inversely, the separation speed increases with the average pore size. In other words, with the current aerogels, when the average value of the pore size is low, the aerogel is suitable for efficient separation, but with a low separation speed. On the other hand, when the average value of the pore size is high, the aerogel results in high separation speeds, but with a falling efficiency. On that basis, at the present time, it is only possible to achieve a compromise by using aerogels having pores of a size limited to a value which is neither too high nor too low, which leads to mediocre results in terms of separation efficiency and separation speed, especially in terms of breakthrough curve.

An object of the present invention is to provide carbon aerogels which are suitable inter alia as separating materials, and especially capable of yielding valuable results in terms of both separation efficiency and separation speed.

To that end, a subject matter of the present invention is carbon aerogels of a novel type which are obtained by coagulation of carbon nanotubes in the form of a cellular structure.

More precisely, the aerogels of the invention are obtained by a specific process, which constitutes another specific object of the invention. That process comprises the following steps:

(A) producing a dispersion of carbon nanotubes in water by using a dispersing surfactant (which is generally ionic, preferably anionic);

(B) producing a foam from the aqueous dispersion of nanotubes obtained in step (A), by swelling of the dispersion under the action of a gas in the presence of a foaming agent; and (C) freezing the foam obtained in step (B), and then removing the water by sublimation, generally by low-temperature freeze-drying.

Advantageously, the process of the invention may comprise, after steps (A) to (C), an additional step (D) wherein the material obtained at the end of step (C) is subjected to heat treatment, typically at a temperature greater than or equal to 400° C., for example at least 600° C., especially at least 800° C. or even at least 1000° C.

The additional step (D) especially allows at least some, (and preferably all) of the surfactant and foaming agents used in steps (A) and (B) to be removed (by pyrolysis). When it is desired to remove all of those agents in order to obtain, at the end of the process, a material that is constituted substantially of carbon, step (D) is advantageously conducted at a temperature greater than or equal to 1200° C., which makes it possible to ensure that the organic species initially present are carbonised completely.

The heat treatment of step (D) can also permit mechanical consolidation of the structure obtained after the freeze-drying of step (C). In order to obtain such a consolidation effect, it is advantageous for step (D) to be conducted in the presence of organic compounds (which is generally the case: the surfactants and/or the foaming agents of steps (A) and (B) are in most cases organic compounds) and at a temperature advantageously greater than 800° C., advantageously greater than 1000° C., for example greater than or equal to 1200° C. Within this context, the organic compounds are likely to act as organic precursors by leading, by pyrolysis, to the formation of carbon capable of binding the carbon nanotubes together.

At the end of the process of the invention there is obtained a material based on agglomerated (coagulated) carbon nanotubes, which is generally monolithic, the structure of which substantially reproduces that of the walls of the foam produced in step (B). In general, the carbon aerogels so obtained have a very specific structure, with substantially open porosity, which generally comprises both:

a "macroporosity" constituted of cells (or "macropores") having an average size greater than 40 microns, more generally greater than or equal to 50 microns, reflecting the structure of the foam formed in step (B), the majority of the pores of this macroporosity typically having sizes of from 50 microns to 600 microns; and a "super-mesoporosity", located substantially within the walls of the cells of the above-mentioned macroporosity, this nanoporosity comprising pores having an average size of less than 60 nm, corresponding substantially to the inter-nanotube voids present in the walls of the foam formed in step (B).

This particular structure of the aerogels of the invention can be demonstrated especially on photographs of the materials obtained by scanning electron microscopy (SEM), examples of which are given in the accompanying figures. The photographs obtained by scanning electron microscopy in most cases show that the walls of the resulting structure comprise nanotubes which are substantially aligned (which is very probably due, especially in part, to the shear phenomena resulting from the flow of water (or drainage) which takes place during the foam formation of step (B) of the process). Scanning electron microscopy additionally allows the sizes of the pores present to be measured.

The particular structure of the aerogels of the invention is additionally reflected in a very low apparent density, which especially is much lower than that of the majority of the carbon aerogels known at present. Accordingly, an aerogel as obtained according to the invention generally has an apparent density which is in most cases less than or equal to 0.25 $g/cm^3$, generally less than or equal to 0.2 $g/cm^3$ and typically around 0.2 $g/cm^3$ (which represents only $^1/_{10}$ of the density of graphite-type carbon), for example of the order of from 0.18 $g/cm^3$ to 0.22 $g/cm^3$.

This very low apparent density reflects a very high pore volume for the aerogels of the invention, where the volume occupied by the pores in most cases represents at least 80% of the total volume of the material, generally at least 90% or even at least 95%.

In addition, the porosity of the aerogels of the invention is generally a substantially open porosity. This particular feature can be demonstrated especially by measuring the density of the material by helium pycnometry. In this type of measurement, the aerogel to be tested is immersed in gaseous helium, which fills all the accessible pores, allowing the density of the material occupying the volume that is not filled with helium to be determined. In the case of the aerogels of the invention, a density of the order of that of graphite carbon (of the order of 2) is then found, which indicates that substantially (and generally almost exclusively) all the pores of the material are accessible and that substantially all the internal spaces of the nanotubes remain accessible.

Accordingly, the aerogels of the invention in most cases have a high specific surface area, generally from 25 to 300 $m^2/g$, that specific surface area advantageously being greater than 30 $m^2/g$, preferably at least 35 $m^2/g$. Within the scope of the present description, the expression "specific surface area" refers to the specific BET surface area, as determined by nitrogen adsorption, according to the known so-called BRUNAUER-EMMET-TELLER method, which is described in *The Journal of the American Chemical Society*, Volume 60, page 309 (1938), and corresponding to international standard ISO 5794/1 (annex D).

The specific structure of the carbon aerogels obtained according to the invention renders them particularly suitable as separating materials, especially for carrying out separations of the solid/liquid type. Within this context, the macroporosity allows good diffusion of the constituents to be obtained, thus inducing high separation speeds, while the nanoporosity permits a good separation efficiency to be obtained. Within this context, the aerogels of the invention can typically be used to constitute membranes or filtration materials, especially for the filtration of biological media (for example blood) or alternatively for the (chemical and/or bacteriological) purification of waste water. The aerogels of the invention can also be used as packing materials for liquid chromatography columns.

Given their specific structure, the aerogels of the invention are also highly suitable for other applications. Especially, owing to the biocompatible nature of carbon, they can be used especially as biomaterials, especially as a support for cell growth, especially for fibroblasts or osteoblasts. In this type of application, the particular porosity of the material ensures optimum colonisation: the macroporosity ensures diffusion of the cells, which are able to reach substantially the totality of the surface of the material, and the nanoporosity brings about an irregularity of the surface of the material which is capable of ensuring that the cells are fixed securely to the aerogel. The aerogels of the invention can be used especially within the scope of the replacement of osseous tissues.

More generally, the aerogels of the invention can be used in the majority of the known applications of carbon-based aerogels insofar as they have the specific advantages of those materials, especially high chemical inertness, especially towards reducing agents, high heat stability to more than 2000° C. (in a non-oxidising medium), as well as very good thermal and electrical conductivity.

Accordingly, the aerogels of the invention can especially be used as a support for catalytic species, for example for the catalysis of reactions in a reducing medium, especially at high temperature, all the more so because they have in most cases the advantage of being super-compressible.

The aerogels of the invention can also be used for the storage of non-wetting liquid, especially for the storage of high-energy liquids in fuel cell membranes, or as the negative electrode in lithium batteries.

The aerogels according to the invention can also be used as sound or anti-vibration insulators. Within this specific context it will be preferred to use mechanically consolidated aerogels as obtained at the end of step (D) mentioned above, advantageously aerogels in which the nanotubes are bonded together by carbon derived from the pyrolysis of organic compounds acting as carbon-containing precursors.

These various uses of the aerogels of the invention constitute a further particular object of the invention.

Surprisingly, the carbon aerogels of the invention and their specific advantages are obtained very simply, only by the implementing succession of steps (A) to (C) and optionally (D) of the process of the invention.

The process of the invention has, inter alia, the advantage of being simple to carry out and inexpensive. Furthermore, it is carried out in an aqueous medium and, in general, does not involve rejects which are subject to specific treatments, which makes it a process which can be used on an industrial scale.

DETAILED DESCRIPTION OF THE INVENTION

Various advantageous features and embodiments of the process of the invention will now be described in greater detail.

Step (A) of the process of the invention comprises the production of an aqueous dispersion of nanotubes.

Within the scope of the present description, "nanotube" is understood as being a tubular carbon-based structure, which is generally based substantially on carbon in the form of graphene sheets, and which has a diameter of from 1 to 200 nm (dimensions can be measured especially from transmission electron microscopy photographs). These compounds belong to the family of the so-called "nanostructured materials", which have at least one characteristic dimension of the order of a nanometer. For further details regarding these materials and their methods of synthesis, reference may be made especially to the articles "Nanotubes from carbon" by P. M. Ajayan (Chem. Rev., Vol. 99, p. 1787, 1999) and "*Carbon nanofibers: catalytic synthesis and applications*" by K. de Jong and J. W. Geus (Catal. Rev. Sci. Eng., Vol. 42, p. 481, 2000).

The nanotubes used in the process of the invention are typically nanotubes of the multiwalled type, namely hollow cylindrical structures based on graphene sheets rolled up on themselves, comprising a plurality of concentric graphene-based cylinders.

Advantageously, there will be used in step (A) nanotubes of the multiwalled type having an average diameter of from 10 to 100 nm, the diameter in most cases being at least 30 nm, for example from 50 to 80 nm. In addition, the average length of the nanotubes used in step (A) is generally from 1 to 20 microns, typically from 5 to 15 microns (for example of the order of 10 microns).

In step (A), the dispersion of the nanotubes in water is carried out in the presence of a suitable surfactant, namely a surfactant suitable for stabilising the nanotube/water interface.

Dispersion can be carried out by any means known per se. It is typically effected by subjecting a water/nanotube/surfactant mixture to sufficient shear, advantageously by subjecting it to ultrasound (sonication).

The surfactant used to produce the dispersion is preferably an ionic surfactant. Anionic surfactants of the sulfate, sulfonate or carboxylate type especially, for example alkyl sulfates or alkylsulfonates, or carboxymethylcellulose salts (especially carboxymethylcellulose sodium salt), have been found to be especially suitable for carrying out the invention. In general, the surfactant employed in step (A) is used in the nanotube dispersion in a concentration below its critical micelle concentration (CMC), above which threshold the nanotubes would tend to aggregate by depletion interaction.

The concentration of nanotubes in the dispersion of step (A) can vary fairly widely as a function of the surfactant used. Nevertheless, in the most general case, it is preferred for the dispersion prepared in step (A) to comprise at least 0.5 g of nanotubes per liter, more advantageously at least 1 g of nanotubes per liter, more advantageously at least 5 g of nanotubes per liter or even at least 10 g of nanotubes per liter, the concentration in most cases being from 1 to 15 g of nanotubes per liter.

It should be noted that the concentration of nanotubes is limited when certain surfactants are used. For example, maximum concentrations of the order of 1 g of nanotubes per liter are achieved with surfactants such as sodium dodecyl sulfate SDS.

On the other hand, other surfactants allow higher concentrations to be achieved. According to an advantageous embodiment, therefore, the surfactant used in step (A) is a carboxymethylcellulose salt, especially the sodium salt, which allows a nanotube concentration of up to 15 g of nanotubes per liter of dispersion to be obtained, while a homogeneous dispersion is retained.

In step (B) of the process of the invention, a foam is produced from the dispersion produced in step (A), by swelling under the action of a gas. Swelling is in most cases carried out by bubbling a gas through the dispersion produced in step (A), the gas advantageously being delivered through sintered glass.

The foam produced within the scope of step (B) is a foam of the liquid/gas type, the structure of which determines the morphology of the final aerogel.

The foam is formed in the presence of a foaming agent, namely an agent capable of stabilising the water/gas interface in the foam that is formed.

To that end, a foaming agent is generally added to the dispersion as obtained at the end of step (A), for example a surfactant suitable for that purpose, for example a non-ionic ethoxylated surfactant such as Tergitol (especially Tergitol NP9 (having the formula $C_{15}H_{24}O(C_2H_4O)_9$).

According to an interesting embodiment of the process of the invention, there can be used as the foaming agent in step (B) starch or, alternatively, a sugar, for example a polysaccharide. The use of starch, or of sugar, especially of the polysaccharide type, is found to be advantageous especially where step (D) is carried out. The starch introduced in step (B) is in fact found in the material obtained at the end of step (C). When step (D) is carried out, at least some of the starch is carbonised, which generally allows the nanotubes constituting the material to be bonded together, which is reflected in an increase in the cohesion of the material and therefore an improvement in its mechanical properties, which is measurable especially by Young's modulus of elasticity. In order to obtain such an effect of improving the mechanical properties when using starch, it is preferred for step (D) to be conducted at a temperature of at least 600° C., preferably at least 800° C., more preferably at least 1000° C. or even at least 1200° C.

In some cases, the surfactant used in step (A) is capable of providing the effect of stabilising the foam of step (B). This is the case especially with SDS, which is found to be useful both as a surfactant for stabilising the water/nanotube interface in step (A) and for stabilising the interface (water/gas) in step (B). In this particular case, no foaming agent is added to the dispersion produced in step (A), but it can prove advantageous to use the surfactant of step (A) in excess relative to the required amount in order to ensure that the nanotubes are stabilised in the dispersion. Accordingly, for example, in the case of SDS, the surfactant will advantageously be used in the dispersion of step (A) in an amount greater than 1 g/l or even greater than 2 g/l. Nevertheless, SDS is generally used in a concentration below its critical micelle concentration (CMC), above which threshold the nanotubes would aggregate by depletion interaction.

Whatever the nature of the foaming agent used in step (B), the formation of the foam in that step is advantageously carried out by injecting bubbles of gas into the dispersion obtained at the end of step (A), if necessary (which is most often the case) with the addition of a foaming agent, the injection of gas bubbles advantageously being carried out through a porous membrane such as sintered glass, above which the dispersion is placed. In that case, the solution is generally placed in the bottom of a receptacle of sufficient size and of a shape suitable for permitting swelling of the foam. There is typically used a tubular cylindrical receptacle equipped with a porous membrane of the sintered glass type in its base (bottom), the volume of the receptacle being at least 20 times the initial volume of the dispersion before foaming.

In step (B), the gas used to carry out the foaming can vary to a fairly large degree. It is advantageously air or nitrogen, to which a hydrophobic organic compound, for example perfluorohexane, can optionally be added. This additional organic compound serves especially to stabilise the air/water interfaces of the foam, thus minimising the Ostwald ripening and coalescence phenomena which destabilise newly formed foams.

The morphology of the foam obtained in step (B) can be controlled by acting on several parameters, especially the following:

The Degree of Wetting of the Foam:
As it rises under the action of the gas that effects foaming, the foam that forms tends to lose its water by gravity, the water tending to flow downwards. This phenomenon tends to form a relatively "dry" foam with non-spherical cavities which are polygonal in shape and relatively unstable. In order to obtain more spherical cavities and improve the stability, the degree of moisture in the foam can be increased, especially by offsetting the loss of water due to gravity by "feeding" the developing foam with water, in its upper portion. To that end, in order that the composition of the foam is not modified at the same time, the top of the developing foam in step (B) can be sprinkled with a dispersion having the same composition as the dispersion that is being foamed by swelling, sprinkling preferably being carried out at a constant flow rate, which allows a homogeneous composition of the foam to be obtained while additionally avoiding any coalescence phenomena.

Accordingly, in step (B), controlling the volume fraction of water in the foam is a good way of controlling the shape of the cells that are produced. A foam having a low volume fraction of water (dry foam) will have cells of polygonal shapes, while a foam having a high volume fraction of water (moist foam) will have cells which are much more spherical in shape. In addition, controlling the volume fraction of water in the starting foams also enables the width of the cell walls (called "Plateau borders") to be controlled.

The Size of the Cavities (Cells) of the Foam that is Formed
This size can be controlled by acting on the size of the gas bubbles initially introduced to carry out the swelling (especially by acting on the size of the pores of the porous membrane used), as well as the flow rate of the gas used. At a constant gas flow rate, the size of the cavities of the resulting foam is generally larger, the larger the gas bubbles that are injected. With constant flow rates of the order of, for example, from 0.1 to 1 ml/s and pore sizes of the porous membrane of the order of from 10 to 250 microns, the average size of the cells of the resulting foam can typically be varied from 50 to 600 microns.

There is generally obtained in step (B) a foam in which the volume ratio liquid/gas is less than or equal to 0.1, that ratio typically being from 0.01 to 0.1.

Broadly, the aim of step (C) of the process is to fix the structure of the foam obtained in step (B).

The foam obtained at the end of step (B) is relatively stable, but not sufficiently so that drying thereof by evaporation can be considered. Accordingly, in step (C), the water is removed by freezing and then freeze-drying.

The freezing of step (C) is advantageously carried out so as to fix the structure of the foam as quickly as possible, so as to avoid any coalescence phenomenon. To that end, freezing is advantageously carried out by placing the foam obtained in step (B) at a temperature below −50° C., more advantageously below −80° C.

The sublimation step is in most cases a low-temperature freeze-drying carried out by any means known per se (especially according to the conventional technique described, for example, on the site www.lyo-san.ca/lyophilisation/htm).

The heat treatment step (D), which is optional, can be conducted especially in a hot cabinet or in an oven, generally in an inert, non-oxidising atmosphere, preferably with a gradual rise in temperature and gradual cooling, typically with temperature rises and drops of the order of several degrees per minute.

In order to optimise this step it can be advantageous for the material subjected to the heat treatment to comprise carbon-containing adjuvants used as carbon precursor. During the heat treatment, these carbon-containing adjuvants decompose into carbon, whereby they are capable of bonding the nanotubes together in the structure that is formed, thus resulting in an improvement in the cohesion and the mechanical properties of the resulting material.

Such carbon-containing adjuvants can be introduced, for example, during steps (A) and/or (B). To that end, as emphasised hereinbefore, starch or a sugar (for example polysaccharide) is advantageously used as the foaming agent in step (B). It is also possible to introduce other carbon-containing adjuvants during steps (A) and/or (B), provided that they do not stand in the way of the formation of the desired foam, for example saccharose, melamine or a phenolic resin.

Alternatively, such carbon-containing adjuvants can be introduced after step (C), before step (D), for example by impregnating the structure obtained at the end of step (C), prior to the heat treatment of step (D).

At the end of these various steps there is generally obtained an aerogel in the form of a generally monolithic, macroscopic material typically having dimensions of the order of a centimeter or of about ten centimeters or even more.

In these aerogels, the nanotubes are advantageously bonded together, the materials preferably having a Young's modulus of elasticity greater than or equal to 5 MPa, for example from 5 to 10 MPa.

For some applications, the resulting aerogels can be post-treated, for example in order to be impregnated with catalytic species.

Figure 1:
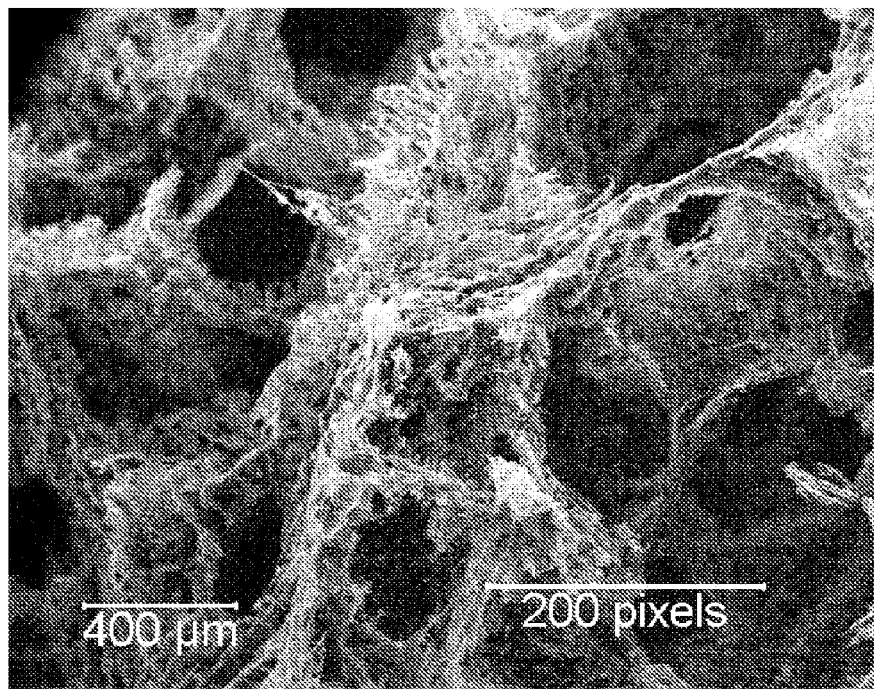
FIG. 1 is a scanning electron microscopy photograph showing the structure of an aerogel according to the invention.
Figure 2:
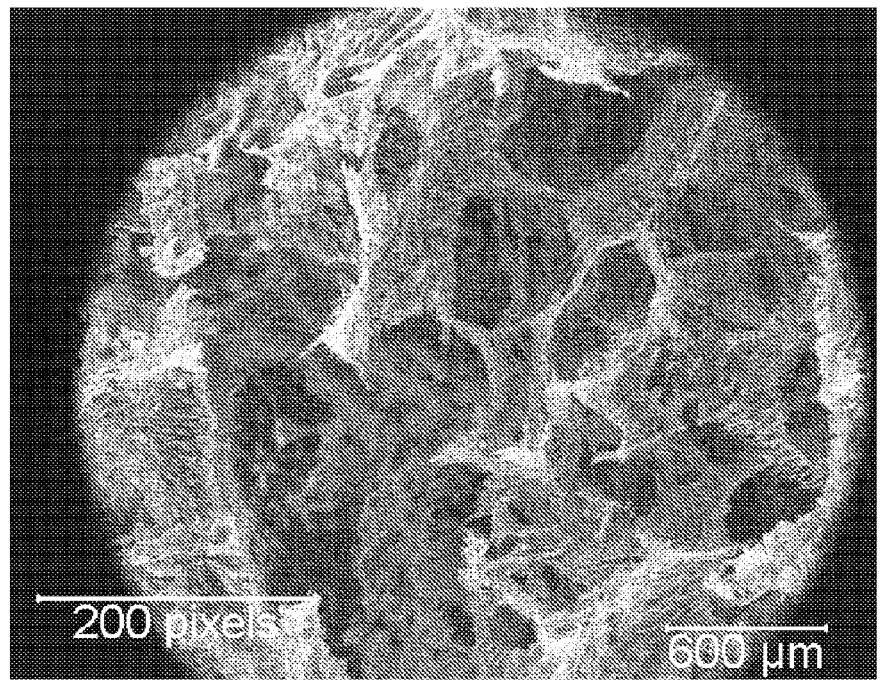
FIG. 2 is a scanning electron microscopy photograph showing the structure of an aerogel according to the invention.

The invention will be made further explicit in view of the exemplary embodiment below and with reference to the accompanying FIGS. 1 and 2, which are scanning electron microscopy photographs of a material as prepared in the example, showing the very specific porosity that is obtained.

EXAMPLE

An aerogel according to the invention is produced under the following conditions.

Preparation of an Aqueous Dispersion (d) of Nanotubes

Within the scope of this specific example, multiwalled carbon nanotubes are used (commercial Pyrograph III, of type PR-24-PS).

An aqueous dispersion of these nanotubes was prepared using carboxymethylcellulose sodium salt as dispersing surfactant.

To that end, 1 g of carboxymethylcellulose sodium salt in 100 ml of water was introduced into a 150 ml Erlenmeyer flask, and then 10 g of nanotubes were introduced into the resulting mixture.

The resulting medium was placed in a bath at 0° C. (liquid water+ice) and was then subjected to sonication for 30 minutes with the aid of a Branson 250 sonicator equipped with a type 12 probe, the end of which measures 3 mm in diameter (80% pulse duration—20 W power). The water and ice bath is used to prevent heating during the sonication.

A dispersion (d) comprising 10% by mass nanotubes and 1% by mass surfactant was thus obtained and was stirred for 12 hours.

Production of a Foam (m)

1 g of Tergitol NP9 (which corresponds to a concentration of 1% by mass Tergitol in the liquid) was added to the dispersion (d) prepared in the preceding step.

The dispersion so obtained was placed in a bubbler constituted by a vertical PVC column (height: 60 cm; diameter: 5 cm) and equipped with a sintered glass bottom having a pore diameter of 30 microns, through which nitrogen is injected at a constant flow rate of 0.2 ml/s. The dispersion was introduced through a pipe above the column, supplied by a peristaltic pump.

After 15 minutes, a relatively stable foam (m) was obtained, which was recovered with the aid of a spatula and immediately placed in a beaker.

Preparation of an Aerogel from the Foam (m)

The beaker was immediately placed at −80° C. and was maintained at that temperature for 5 hours.

At the end of this freezing, the resulting frozen foam was freeze-dried using a low-temperature freeze-dryer (vessel under vacuum). The water was thus removed by sublimation, yielding an aerogel.

Consolidation by Heat Treatment

The aerogel obtained in the preceding step was subjected to heat treatment under the following conditions:

temperature rise from ambient temperature (25° C.) to 400° C. in 2 hours, plateau at 400° C. for one hour, temperature drop from 400° C. to ambient temperature (25° C.) in 2 hours.

A material having the following properties was thus obtained:

apparent density: 0.2 real density: 2.1 specific BET surface area: 36 m²/g porosity having a porous macrostructure with pores of dimensions of around 50 microns with, inside the walls of that macrostructure, pores of a size of from 2 to 50 nm.

The invention claimed is:

1. A carbon aerogel formed by producing a dispersion of carbon nanotubes in water by using a dispersing surfactant, producing a foam from the aqueous dispersion of nanotubes obtained by the producing the dispersion of the carbon nanotubes, by swelling the dispersion under an action of a gas, in the presence of a foaming agent and freezing the foam obtained, and then removing the water by sublimation, the formed carbon aerogel resulting from a coagulation of carbon nanotubes in a form of a cellular structure, wherein, the carbon aerogel has a structure with substantially open porosity and which structure comprises both:

a macroporosity constituted by cells or macropores having an average size greater than 40 microns; and a super-mesoporosity, substantially located within walls of the cells of the macroporosity, the super-mesoporosity comprising pores having an average size below 60 nm, and the carbon aerogel has an apparent density of less than or equal to 0.25 g/cm³.

2. The carbon aerogel of claim 1, wherein a volume occupied by the pores represents at least 80% of a total volume of the material.

3. The carbon aerogel of claim 1, having a specific surface area of from 25 to 300 m²/g.

4. A separating material, suitable for carrying out separations of a solid/liquid type, comprising a carbon aerogel according to claim 1.

5. A biomaterial suitable for a cell growth support comprising a carbon aerogel according to claim 1.

6. The carbon aerogel of claim 1, wherein the carbon aerogel has an apparent density of less than or equal to 0.2 g/cm³.

7. The carbon aerogel of claim 1, wherein the carbon aerogel has an apparent density in a range of from 0.18 g/cm³ to 0.22 g/cm³.

8. A process for a preparation of a carbon aerogel, comprising the following steps:

(A) producing a dispersion of carbon nanotubes in water by using a dispersing surfactant;

(B) producing a foam from the aqueous dispersion of nanotubes obtained in step (A), by swelling the dispersion under an action of a gas, in the presence of a foaming agent; and (C) freezing the foam obtained in step (B), and then removing the water by sublimation, thereby forming the carbon aerogel, wherein, the formed carbon aerogel has a structure with substantially open porosity and which structure comprises both:

a macroporosity constituted by cells or macropores having an average size greater than 40 microns; and a super-mesoporosity, substantially located within walls of the cells of the macroporosity, the super-mesoporosity comprising pores having an average size below 60 nm, and the carbon aerogel has an apparent density of less than or equal to $0.25$ g/cm$^3$.

9. The process of claim 8, further comprising, after steps (A) to (C), an additional step (D) wherein the material obtained at the end of step (C) is subjected to heat treatment at a temperature greater than 400° C.

10. The process of claim 9, wherein step (D) is conducted in the presence of organic compounds and at a temperature greater than 800° C.

11. The process of claim 10, wherein step (D) is conducted at a temperature greater than or equal to 1200° C.

12. The process of claim 8, wherein the nanotubes used in step (A) have an average diameter of from 10 to 100 nm and an average length of from 1 to 20 microns.

13. The process of claim 8, wherein the surfactant used in step (A) is an ionic surfactant, preferably an anionic surfactant of a sulfate, sulfonate or carboxylate type; or another ionic surfactant.

14. The process of claim 13, wherein the surfactant of step (A) is a carboxymethylcellulose carboxymethylcellulose sodium salt or another carboxymethylcellulose salt.

15. The process of claim 8, wherein the dispersion prepared in step (A) comprises from 1 to 15 g of nanotubes per liter.

16. The process of claim 8, wherein, in step (B), a foaming agent is added to the dispersion as obtained at the end of step (A).

17. The process of claim 16, wherein the foaming agent added is a non-ionic ethoxylated surfactant.

18. The process of claim 16, wherein the foaming agent added is starch, a polysaccharide, or another sugar.

19. The process of claim 8 wherein sodium dodecyl sulfate SDS is used both as the dispersing surfactant of step (A) and as the foaming agent of step (B).

20. The process of claim 8, wherein a formation of the foam of step (B) is carried out by injecting bubbles of gas into the dispersion obtained at the end of step (A), to which gas a foaming agent has been added, if necessary, the injection of gas bubbles being carried out through a porous membrane above which the dispersion is placed.

21. The process of claim 8, wherein, in step (B), a top of the developing foam is sprinkled with a dispersion having a same composition as the dispersion that is being foamed by swelling.

22. The process of claim 8, wherein, in the foam produced in step (B), a ratio by volume liquid/gas is less than 0.1.

\* \* \* \* \*

UNITED STATES PATENT AND TRADEMARK OFFICE
CERTIFICATE OF CORRECTION

PATENT NO.        : 8,591,857 B2
APPLICATION NO. : 12/519932
DATED             : November 26, 2013
INVENTOR(S)       : Backov et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this
Twenty-second Day of September, 2015

Michelle K. Lee
*Director of the United States Patent and Trademark Office*